US 6,587,037 B1

(12) United States Patent
Besser et al.

(10) Patent No.: US 6,587,037 B1
(45) Date of Patent: Jul. 1, 2003

(54) METHOD FOR MULTI-PHASE DATA COMMUNICATIONS AND CONTROL OVER AN ESP POWER CABLE

(75) Inventors: Gordon L. Besser, Claremore, OK (US); Dick L. Knox, Claremore, OK (US); Jerald Rider, Catoosa, OK (US); Dan D. Toomey, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/566,841

(22) Filed: May 5, 2000

Related U.S. Application Data

(63) Continuation-in-part of application No. 09/029,732, filed on Feb. 8, 1999, now Pat. No. 6,167,965.

(51) Int. Cl.[7] .............................................. H04M 11/04
(52) U.S. Cl. .............................. 340/310.01; 340/310.02
(58) Field of Search ........................ 340/310.01, 310.02, 340/310.03, 310.06, 310.7, 310.8

(56) References Cited

U.S. PATENT DOCUMENTS

| | | | | |
|---|---|---|---|---|
| 3,950,676 A | * | 4/1976 | Dornseifer | 317/14 R |
| 4,188,619 A | * | 2/1980 | Perkins | 340/310.01 |
| 4,475,209 A | * | 10/1984 | Udren | 375/4 |
| 4,652,855 A | * | 3/1987 | Weikel | 340/310 R |
| 4,876,539 A | | 10/1989 | Farque | 340/856 |
| 5,444,184 A | * | 8/1995 | Hassel | 174/113 R |
| 5,515,038 A | | 5/1996 | Smith | 340/853.3 |
| 5,539,375 A | | 7/1996 | Atherton | 340/310.01 |
| 5,900,179 A | * | 5/1999 | Bilenko et al. | 219/508 |
| 5,999,094 A | * | 12/1999 | Nilssen | 340/507 |
| 6,154,488 A | * | 11/2000 | Hunt | 375/219 |

FOREIGN PATENT DOCUMENTS

| | | |
|---|---|---|
| WO | WO 96/23368 | 8/1996 |
| WO | WO 98/06187 | 2/1998 |

* cited by examiner

*Primary Examiner*—Julie Lieu

(57) ABSTRACT

A three phase power cable is employed to transmit data encoded in a phase-to-phase manner within a high frequency carrier signal transmitted simultaneously with power transmitted from surface equipment to downhole components. The high frequency carrier signal is transmitted on all conductors of the power cable, with the signal carried on at least two phases or conductors modulated between the two conductors to encode data between the two phases. Any modulation technique may be employed. Multiple phase-to-phase signals may be encoded and transmitted between different pairs of the power cable conductors, or the same data may be encoded and transmitted in multiple phase-to-phase signals in either a single-ended or differential manner. The high frequency carrier may be employed to transmit data from sensors downhole to the surface equipment, control signals from the surface equipment to the downhole components, or both.

20 Claims, 3 Drawing Sheets

METHOD FOR MULTI-PHASE DATA COMMUNICATIONS AND CONTROL OVER AN ESP POWER CABLE

RELATED APPLICATIONS

The present invention is a continuation-in-part of commonly assigned, co-pending U.S. patent application Ser. No. 09/029,732, filed Feb. 8, 1999, now U.S. Pat. No. 6,167,965 entitled "AN IMPROVED ELECTRICAL SUBMERSIBLE PUMP AND METHODS FOR ENHANCED UTILIZATION OF ELECTRICAL SUBMERSIBLE PUMPS IN THE COMPLETION AND PRODUCTION OF WELLEORES" and filed Feb. 8, 1999. The content of the above-identified application is incorporated herein by reference.

BACKGROUND OF THE INVENTION

1. Technical Field:

The present invention generally relates to data telemetry systems for downhole sensors and other equipment and in particular to systems employed for data telemetry over power cables for an electrical submersible pump. Still more particularly, the present invention relates to employing phase-to-phase signaling over three phase power cables to an electrical submersible pump for downhole telemetry.

2. Description of the Related Art

Various downhole telemetry systems for returning electrical signals from sensors within a borehole have been proposed and/or utilized. Several such systems employ the three phase power cable transmitting three phase power downhole to an electrical submersible pump or other load device for transmitting the telemetry signals. Within this type of system, generally the signaling arrangement treats all three phases of the power conductor cables as a single conductor and requires a ground reference for the return path, typically the production tubing and well casing.

Systems which treat the three phase power cable as a single conductor, such as U.S. Pat. Nos. 5,515,038 to Smith and 5,539,375 to Atherton, generally employ direct current (DC) offsets to the alternating current (AC) power transmitted by the cable. Additionally, many systems which treat the three phase power cable as a single conductor cannot tolerate a ground referenced electrical power system, either intentional or inadvertent. Thus, for example, if one phase or conductor of the power system should accidentally be shorted to ground, the aspects of downhole components which rely on the three-phase power (e.g., the pumping capability of the ESP) continue to operate while the telemetry system is disabled.

It would be desirable, therefore, to provide a telemetry system employing three-phase power conductors for an ESP for the data signals without requiring a return or ground reference conductor, but fault-tolerant with respect to unintentional grounding of one phase.

SUMMARY OF THE INVENTION

It is therefore one object of the present invention to provide an improved data telemetry system for downhole sensors.

It is another object of the present invention to provide improved data telemetry over power cables for an electrical submersible pump.

It is yet another object of the present invention to provide a mechanism for employing differential signalling over three phase power cables to an electrical submersible pump for downhole telemetry.

The foregoing objects are achieved as is now described. A three phase power cable is employed to transmit data encoded in a phase-to-phase manner within a high frequency carrier signal transmitted simultaneously with power transmitted from surface equipment to downhole components.

The high frequency carrier signal is transmitted on at least two conductors of the power cable, with the signal carried on at least two phases or conductors modulated between at least two conductors to encode data between the two phases. Any modulation technique may be employed. Multiple phase-to-phase signals may be encoded and transmitted between different pairs of the power cable conductors, or the same data may be encoded and transmitted in multiple phase-to-phase signals in either a single-ended or differential manner. The high frequency carrier may be employed to transmit data from sensors downhole to the surface equipment, control signals from the surface equipment to the downhole components, or both.

The above as well as additional objectives, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
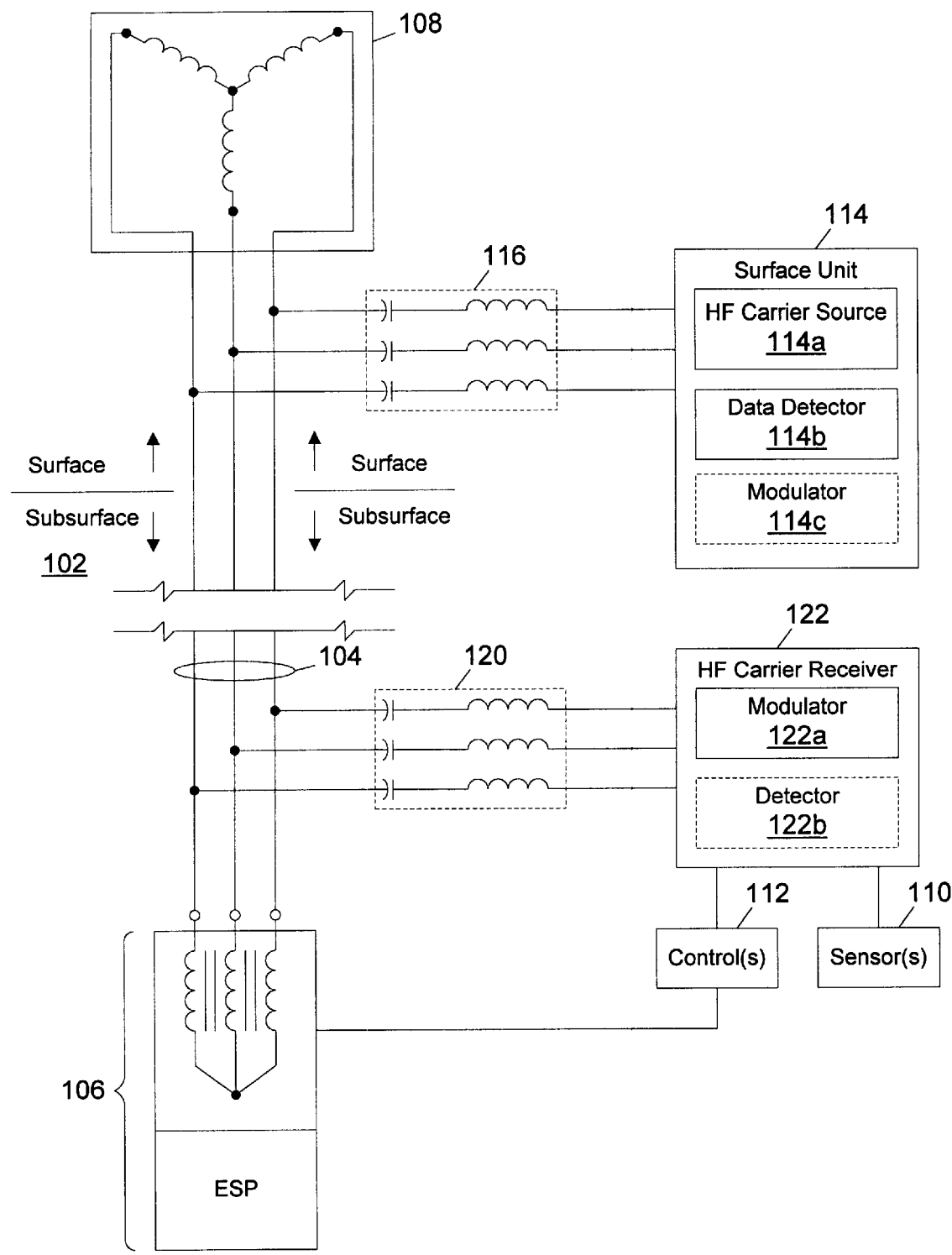
FIG. 1 depicts a data telemetry system employed with an electrical submersible pump in accordance with a preferred embodiment of the present invention.

With reference now to the figures, and in particular with reference to FIG. 1, a data telemetry system employed with an electrical submersible pump in accordance with a preferred embodiment of the present invention is depicted. The data telemetry system 102 includes a three phase power cable 104 having separate conductors for each phase and which may be a flat or round cable, with the internal insulated conductors aligned in a plane or forming the vertices of a triangle, as seen from the cross-section.

Three phase power cable 104 is connected to an electrical submersible pump (ESP) and motor assembly 106 adapted for use within a bore hole and disposed within the bore hole by connection to tubing lowered within the casing for a well. Pump and motor assembly 106 includes an ESP, which may be of the type disclosed in U.S. Pat. 5,845,709, coupled to a motor (e.g., an induction motor). The motor drives the ESP and is powered by three phase power transmitted over three phase transmission cable 104 electrically coupling pump and motor assembly 106 to a surface power source 108.

Three phase transmission cable 104 transmits three phase power from a surface power system 108. Surface power system may be any suitable three phase power system such as an inverter, a motor or turbine driven generator and/or an alternator producing three phase alternating current of about 380 to 5,000 volts (RMS) at a typical frequency of 30–90 Hz.

Sensors 110 disposed proximate to pump and motor assembly 106 within the bore hole measure selected parameters such as temperature, pressure, and/or flow rate and generate electrical signals representative of the measurements, typically as a direct current (DC) voltage or current. Additionally, controls 112 for controlling the operation of motor/pump assembly 106 may also be configured to receive DC voltage or current control signals from the surface. In the present invention, such measurement and control signals are transmitted over the conductors of three phase power cable 104 in a high frequency, phase-to-phase manner.

The exemplary embodiment of the present invention employs a surface unit 114 including a high frequency (HF) carrier source 11a and a "differential" or phase-to-phase data detector 114b located at a surface location and connected to three phase power cable 104 proximate to power source 108. The HF carrier source 114a produces a high frequency carrier signal which may be combined with the three phase power transmitted over cable 104. In general, any frequency above the fundamental frequency of the three phase power may be employed as the HF carrier signal generated by HF carrier source 114a. Thus, since the frequency of three phase power employed within the power system is typically transmitted at a frequency of approximately 30–90 Hz and occasionally transmitted at frequencies of up to 120 Hz, an 80 KHz signal is suitable for the high frequency carrier employed by the present invention. The carrier signal may be transmitted on any two or more phases or conductors of power cable 104.

Figure 2:
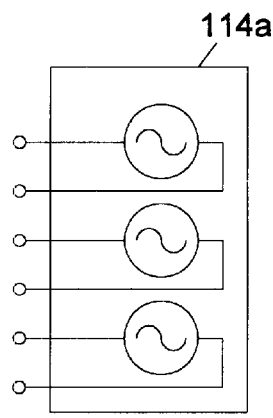
FIG. 2 is a schematic for a HF carrier source in accordance with a preferred embodiment of the present invention.

Referring to FIG. 2, a schematic for a HF carrier source in accordance with a preferred embodiment of the present invention is illustrated. HF carrier source 114a may be simply one or more inverters coupled to an external power source to convert received power to the desired frequency. Only a single inverter—single phase or three phase—is necessary, although separate inverters for each phase (as shown) may also be utilized. The inverter(s) within HF carrier source 114a are connected to at least two phases or conductors of power cable 104.

Referring again to FIG. 1, HF carrier source 114a is coupled to three phase power cable 104 by coupling filter 116, which allows high frequency signals to pass while blocking lower frequencies including the fundamental frequency of the three phase power transmitted on cable 104. Coupling filter 116 may be, for example, a bandpass filter tuned to the selected carrier frequency (80 KHz in the exemplary embodiment), allowing the carrier frequency to pass while blocking all other frequencies.

The present invention preferably includes a second coupling filter 120 similar to coupling filter 116, blocking out low frequencies, such as the fundamental frequency of the three phase power transmitted on power cable 104, while allowing high frequencies, and particularly the selected carrier frequency, to pass.

Coupling filter 120 connects HF carrier receiver 122 and modulator 122a to power cable 104. HF carrier receiver 122 and modulator 122a are located downhole proximate to motor/pump assembly 106. HF carrier receiver 122 and modulator 122a may be coupled, for instance, to the tubing (not shown) bearing motor/pump assembly 106 at or near the point of connection between the tubing and motor/pump assembly 106. HF carrier receiver 122 and modulator 122a receives data from sensors 110 and modulates the high frequency carrier signal to encode the data from sensors 110 within the carrier signal. Data is encoded within the high frequency carrier signal in a phase-to-phase manner, either in a single phase-to-phase signal (between any two phases), in two phase-to-phase signals (e.g., between phase A and phase B and between phase B and phase C), or in three phase-to-phase signals.

Data may be encoded within the high frequency carrier signal utilizing frequency modulation (FM), amplitude modulation (AM), frequency shift key (FSK) modulation, phase shift key (PSK) modulation, or any other modulation technique. Data encoded within the high frequency carrier signal by HF carrier receiver and modulator propagates through coupling filter 120, up power cable 104, and through coupling filter 116 to surface unit 114. Data detector 114b extracts the data encoded within the high frequency carrier signal by demodulating two or more selected phases to retrieve the original data signal. The data extracted from the high frequency carrier signal may then be passed to a recording device and/or control system.

Although the exemplary embodiment depicts data detector 114b at a surface location and modulator 122a downhole, a detector 122b may be situated downhole and a modulator 114c included within the surface unit 114 to allow command and control signals to be passed to controls 112 from the surface, allowing remote control over the operation of motor/pump assembly 106. Detectors and modulators may be located both at the surface and downhole to permit bidirectional communication.

Figure 3A:
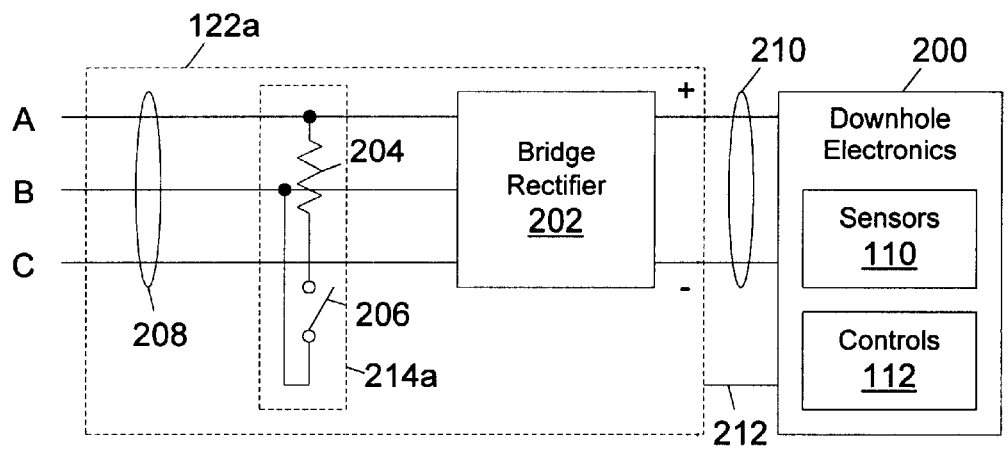
FIGS. 3A–3D depict schematic diagrams for a high frequency carrier signal modulator in accordance with a preferred embodiment of the present invention.

With reference to FIGS. 3A through 3D, schematic diagrams for a high frequency carrier signal modulator in accordance with a preferred embodiment of the present invention are depicted. FIG. 3A depicts a modulator 122a encoding data in the high frequency carrier signal within a single phase-to-phase signal transmitted on the three phase power cable. Modulator 122a is connected to downhole electronics 200, including sensors 110 and controls 112.

Modulator 122a includes a bridge rectifier 202 receiving the high frequency carrier signal on conductors 208 and rectifies the high frequency carrier signal to generate direct current (DC) power passed to downhole electronics 200 via conductors 210. Downhole electronics 200 is also connected to modulator 122a through data signal line 212, over which the data to be encoded within the high frequency carrier signal is transmitted.

Modulation of the high frequency carrier signal is accomplished by a resistor 204 and switch 206 connected in series between two selected phases of the three phase power, between two of conductors 208. Resistor 204 is sized to selectively alter the phase-to-phase current or voltage amplitude when switch 206 is closed. Switch 206 of modulation mechanism 214a is controlled to encode the data within the phase-to-phase current or voltage amplitude alterations.

Figure 3B:
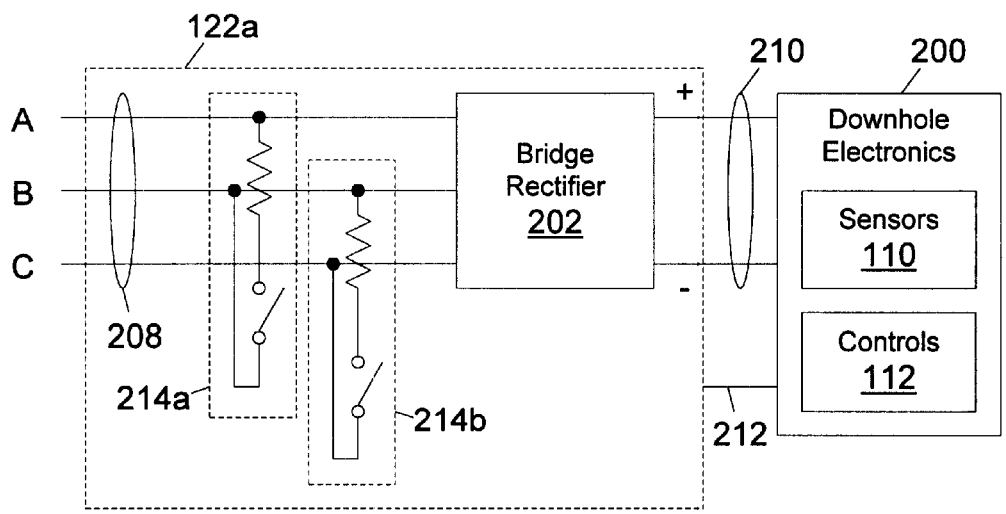
Figure 3C:
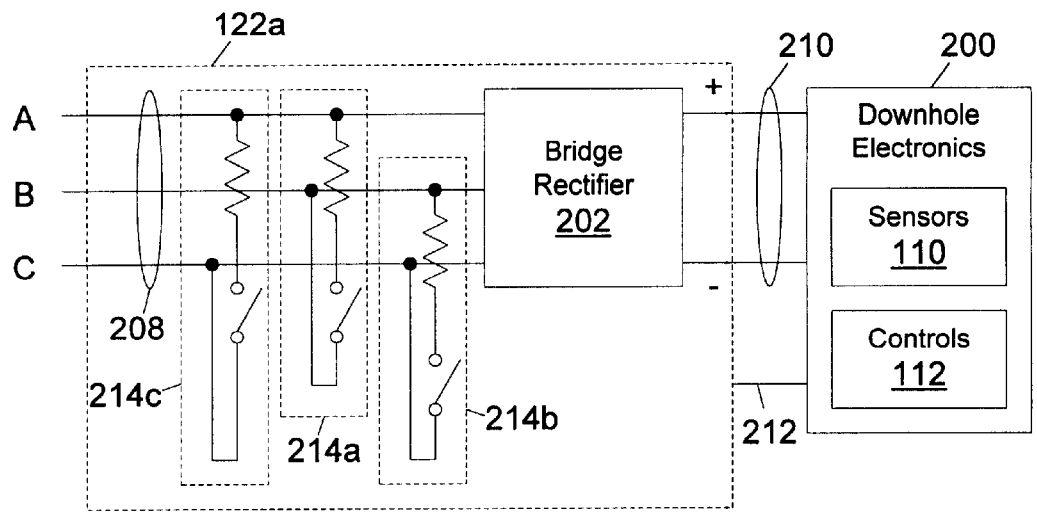

FIG. 3B depicts a modulator 122a including two modulation mechanisms 214a and 214b between each between a different pair of phases or conductors 208. FIG. 3C depicts a modulator 122a including three modulation mechanisms 214a, 214b and 214c each between a different pair of phases or conductors 208. In both cases, all modulation mechanisms 214a–214c are controlled in conjunction to encode the same data in two or more phase-to-phase signals.

Figure 3D:
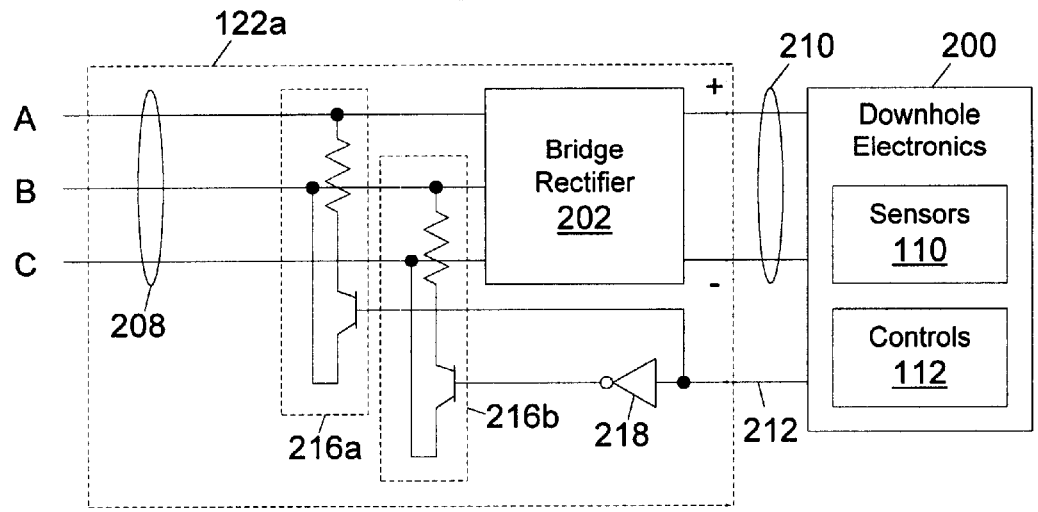

FIG. 3D depicts one implementation of the circuit depicted in FIG. 3B. Each modulation mechanism 216a–216b includes a transistor connected in series with the load resistor, serving as a selectively controllable switch. The gate or base of one transistor is connected directly to data signal 212, while the gate or base of the other transistor is connected to data signal 212 via an inverter 218. The result is a differential pair of phase-to-phase signals between phases A and B and between phases B and C.

Figure 4:
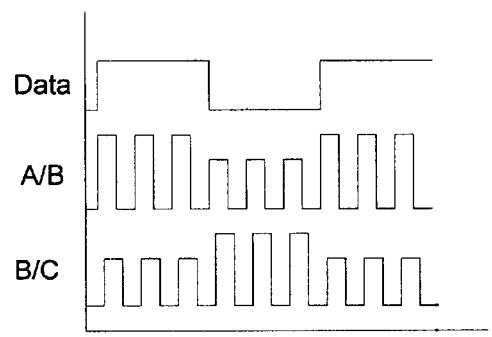
FIG. 4 is a timing diagram for signals involved in decoding phase-to-phase encoded data from a high frequency carrier signal in accordance with a preferred embodiment of the present invention.

Referring to FIG. 4, a timing diagram for signals involved in decoding phase-to-phase encoded data from a high frequency carrier signal in accordance with a preferred embodiment of the present invention are illustrated. The signals illustrated relate to the implementation depicted in FIG. 3D, The data signal is encoded within the phase-to-phase signal between phases A and B, while the inverse of the data signal is encoded within the phase-to-phase signal between phases B and C, effectively creating a differential signal. Amplitudes of 10–15 mA may be suitably employed for the different signal levels. Although a square wave high frequency carrier signal is depicted, sinusoidal or other waveforms may alternatively be employed. The encoded signal is recovered from each phase-to-phase signal by filtering out the three phase power to obtain the high frequency carrier with the encoded data, then subtracting one phase current from the current of the other phase. Although encoding within two phase-to-phase signals is illustrated, a single phase-to-phase signal or phase-to-phase signals between all three phases or conductors may also be employed.

The present invention is independent from ground and may be employed in ground-referenced systems or when one phase fails to ground. The signaling system of the present invention allows for electrical testing as the motor/pump assembly is lowered downhole. The high frequency system of the present invention provides a signal speed advantage over direct current signaling methods, which are slowed by the requisite filtering.

While the invention has been particularly shown and described with reference to a preferred embodiment, it will be understood by those skilled in the art that various changes in form and detail may be made therein without departing from the spirit and scope of the invention.

What is claimed is:

1. A method of communication over a power cable, comprising:
    transmitting power over a three phase power cable connecting surface equipment to downhole components;
    transmitting a phase-to-phase signal over at least two conductors of the power cable concurrently with the power by:
        transmitting a first phase-to-phase, high frequency signal representing data between a first conductor pair within the three phase power cable; and
        transmitting a second phase-to-phase, high frequency signal representing an inverse of the data between a second conductor pair within the three phase power cable; and
    decoupling the phase-to-phase signal from the power transmitted over the power cable.

2. The method of claim 1, wherein the step of transmitting a phase-to-phase signal over at least two conductors of the power cable concurrently with the power further comprises:
    transmitting a signal independent of a ground reference by altering a relative voltage between the at least two conductors.

3. The method of claim 1, wherein the step of transmitting a phase-to-phase signal over at least two conductors of the power cable concurrently with the power further comprises:
    supplying operational power to downhole sensing or control components;
    transmitting control signals from the surface equipment to the downhole components; and
    transmitting data from the downhole components to the surface equipment.

4. A method of communication over a power cable, comprising:
    transmitting a signal over a multi-conductor power cable connecting surface equipment to downhole components, the signal including three phase power for the downhole components and a high frequency signal modulated between at least two conductors of the power cable and independent of a ground reference, wherein the high frequency signal includes a first phase-to-phase, high frequency signal representing data between a first conductor pair within the power cable and a second phase-to-phase, high frequency signal representing an inverse of the data between a second conductor pair within the power cable; and
    sensing the high frequency signal from the signal received over the power cable at the downhole components.

5. The method of claim 4, wherein the step of transmitting a signal over a multi-conductor power cable connecting surface equipment to downhole components further comprises:
    transmitting an electrical signal having a current or voltage modulated by a modulation technique selected from frequency modulation, amplitude modulation, frequency shift key modulation, and phase shift key modulation.

6. The method of claim 4, wherein the step of transmitting a signal over a multi-conductor power cable connecting surface equipment to downhole components further comprises:
    transmitting control signals from the surface equipment to the downhole components; and
    transmitting data from the downhole components to the surface equipment.

7. The method of claim 6, wherein the step of sensing the high frequency signal from the signal received over the power cable at the downhole components further comprises:
    filtering the high frequency signal from the three phase power within the signal received over the power cable; and
    filtering the three phase power from the high frequency signal within the signal received over the power cable.

8. The method of claim further comprising:
    transmitting the three phase power to an electrical submersible pump motor;
    rectifying the high frequency signal to provide operational power to selected downhole components; and
    subtracting the filtered high frequency signal received on a first conductor connector to a first three phase power cable conductor from the filtered high frequency signal received on a second conductor connected to a second three phase power cable conductor to extract data from the filtered high frequency signal.

9. A system for communication over a power cable, comprising:
    surface equipment connected to downhole components by a three phase power cable transmitting power to the downhole components;
    a driver transmitting a phase-to-phase signal over at least two conductors of the power cable concurrently with the power, the driver including a modulator generating a first phase-to-phase, high frequency signal representing data between a first conductor pair within the three phase power cable a second phase-to-phase, high frequency signal representing an inverse of the data between a second conductor pair within the three phase power cable; and a receiver decoupling the phase-to-phase signal from the power received over the power cable.

10. The system of claim 9, wherein the driver further comprises:

a driver transmitting a signal independent of a ground reference by altering a relative voltage between the at least two conductors.

11. The system of claim 9, wherein the driver further comprises:

a first driver supplying operational power to downhole sensing or control components and transmitting control signals from the surface equipment to the downhole components; and a second driver transmitting data from the downhole components to the surface equipment.

12. A system for communication over a power cable, comprising:

surface equipment transmitting a signal over a multi-conductor power cable connecting surface equipment to downhole components, the signal including three phase power for the downhole components and a high frequency signal modulated between at least two conductors of the power cable and independent of a ground reference, the surface equipment including a driver transmitting a first phase-to-phase, high frequency signal representing data between a first conductor pair within the power cable and a second phase-to-phase, high frequency signal representing an inverse of the data between a second conductor pair within the power cable; and a receiver within the downhole components sensing the high frequency signal from the signal received over the power cable at the downhole components.

13. The system of claim 12, wherein the surface equipment further comprises:

a modulator generating an electrical signal having a current or voltage modulated by a modulation technique selected from frequency modulation, amplitude modulation, frequency shift key modulation, and phase shift key modulation.

14. The system of claim 12, wherein the surface equipment includes a driver transmitting control signals from the surface equipment to the downhole components, the downhole components further comprising:

a driver transmitting data from the downhole components to the surface equipment.

15. The system of claim 12, further comprising:

a first filter within the downhole components filtering the high frequency signal from the three phase power within the signal received over the power cable; and a second filter within the downhole components filtering the three phase power from the high frequency signal within the signal received over the power cable.

16. The system of claim 15, further comprising:

conductors transmitting the three phase power from the first filter to an electrical submersible pump motor;

a bridge rectifier connected to the second filter rectifying the high frequency signal to provide operational power to selected downhole components; and a modulator connected to the second filter and selectively connecting a load between a first conductor connected to a first three phase power cable conductor and a second conductor connected to a second three phase power cable conductor to encode data within the high frequency signal.

17. The system of claim 16, further comprising:

a third filter within the surface equipment connected to the power cable and filtering the three phase power from the high frequency signal within the signal received over the power cable; and a demodulator within the surface equipment connected to the third filter and subtracting the filtered high frequency signal received on a first conductor connected to the first three phase power cable conductor from the filtered high frequency signal received on a second conductor connected to the second three phase power cable conductor to extract data from the filtered high frequency signal.

18. The method of claim 1, wherein the step of transmitting a phase-to-phase signal over at least two conductors of the power cable concurrently with the power further comprises:

modulating a load current between the two phases.

19. The method of claim 1, wherein the step of transmitting a phase-to-phase signal over at least two conductors of the power cable concurrently with the power further comprises:

employing a constant load current to produce the phase-to-phase signal.

20. The method of claim 1, wherein the step of transmitting a phase-to-phase signal over at least two conductors of the power cable concurrently with the power further comprises:

employing a frequency higher than a frequency of the three phase power for the phase-to-phase signal.

* * * * *